United States Patent [19]

Hallmark et al.

[11] Patent Number: 4,539,341
[45] Date of Patent: Sep. 3, 1985

[54] DIGESTION PRODUCTS OF POLYALKYLENE TEREPHTHALATE POLYMERS AND POLYCARBOXYLIC ACID-CONTAINING POLYOLS AND POLYMERIC FOAMS OBTAINED THEREFROM

[75] Inventors: Richard K. Hallmark, Largo; Michael J. Skowronski, Clearwater; William D. Stephens, Pinellas Park, all of Fla.

[73] Assignee: Jim Walter Resources, Inc., Birmingham, Ala.

[21] Appl. No.: 582,348

[22] Filed: Feb. 22, 1984

[51] Int. Cl.³ .............................................. C08G 18/14
[52] U.S. Cl. .................... 521/172; 427/373; 427/385.5; 427/387; 428/423.1; 521/48.5; 521/173
[58] Field of Search ...................... 521/48.5, 172, 173; 427/373, 385.5, 387; 428/423.1

[56] References Cited

U.S. PATENT DOCUMENTS

| | | | |
|---|---|---|---|
| 2,423,042 | 6/1947 | Muskat | 260/75 |
| 2,937,151 | 5/1960 | Ten Broeck et al. | 260/2.3 |
| 3,023,192 | 2/1962 | Shivers, Jr. | 260/75 |
| 3,257,335 | 6/1966 | Whitfield, Jr. et al. | 260/2.3 |
| 3,382,203 | 5/1968 | Rating et al. | 260/33.4 |
| 3,427,267 | 2/1969 | Stieger et al. | 521/48.5 |
| 3,431,223 | 3/1969 | Reymore, Jr. et al. | 260/2.5 |
| 3,446,758 | 5/1969 | Wiener | 260/2.3 |
| 3,502,601 | 3/1970 | Case et al. | 260/2.5 |
| 3,574,167 | 4/1971 | Case et al. | 260/75 |
| 3,639,307 | 2/1972 | Doerge et al. | 260/2.5 AJ |
| 3,647,759 | 3/1972 | Walker | 260/75 R |
| 3,676,376 | 7/1972 | Svoboda et al. | 260/2.5 |
| 3,699,082 | 10/1972 | Koerner et al. | 260/75 |
| 3,907,868 | 9/1975 | Currie et al. | 260/475 |
| 3,957,709 | 5/1976 | Holzrichter et al. | 260/29.4 R |
| 4,039,487 | 8/1977 | Kolakowski et al. | 521/125 |

(List continued on next page.)

FOREIGN PATENT DOCUMENTS 2506774 8/1975 Fed. Rep. of Germany .
49-13138 2/1974 Japan .

OTHER PUBLICATIONS

High Polymers, vol. VIII, 1952, pp. 242–245.
T. Davies, "Interchange Reactions", in High Polymers, vol. XIX, E. M. Fettes, 1964, pp. 501–507, 546 and 547.
V. V. Korshak and S. V. Vinogradova, Polyesters, translated by B. J. Hazzard, Pergammon Press, Oxford, 1965, pp. 52 and 324.
I. Goodman, Polyesters, vol. I, 1965, pp. 114–117.
Encycl. of Poly. Sci. & Tech., vol. 11, 1969, pp. 506 and 513; 73–74.

(List continued on next page.)

Primary Examiner—Maurice J. Welsh
Attorney, Agent, or Firm—James W. Grace; Charles W. Vanecek

[57] ABSTRACT

A storage stable polyester polyol mixture is prepared by digesting polyalkylene terephthalate, particularly polyethylene terephthalate, with a digesting medium comprising a polycarboxylic acid component-containing polyol, wherein the polycarboxylic acid component has

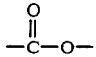

ring units with two groups adjacent or alternate ring positions, the ring unit content of the polycarboxylic acid component being sufficient for improved storage stability of the digestion product. The polyester polyol mixture is useful in the preparation of cellular foam materials, particularly polyisocyanurate and polyurethane foams.

52 Claims, 3 Drawing Figures

U.S. PATENT DOCUMENTS

| | | | |
|---|---|---|---|
| 4,048,104 | 9/1977 | Svoboda et al. | 521/159 |
| 4,078,143 | 3/1978 | Malik et al. | 560/78 |
| 4,092,276 | 5/1978 | Narayan | 521/108 |
| 4,100,354 | 7/1978 | Owen, Jr. | 560/89 |
| 4,201,859 | 5/1980 | Agarwal | 528/302 |
| 4,223,068 | 9/1980 | Carlstrom et al. | 521/131 |
| 4,233,408 | 11/1980 | Satterly et al. | 521/172 |
| 4,237,238 | 12/1980 | DeGuiseppi et al. | 521/131 |
| 4,246,365 | 1/1981 | Wiedermann et al. | 521/172 |
| 4,251,649 | 2/1981 | Hara et al. | 525/439 |
| 4,259,478 | 3/1981 | Jackson, Jr. et al. | 528/307 |
| 4,346,229 | 8/1982 | Derr et al. | 560/91 |
| 4,417,001 | 11/1983 | Svoboda et al. | 521/114 |
| 4,439,546 | 3/1984 | Brennan et al. | 521/48 |
| 4,439,549 | 3/1984 | Brennan | 521/131 |
| 4,439,550 | 3/1984 | Brennan | 521/131 |
| 4,439,551 | 3/1984 | Yeakey et al. | 521/131 |

OTHER PUBLICATIONS

Frisch and Saunders, Plastic Foams, Part II, vol. 1, 1973, pp. 451, 460, 461, 474 and 475.

H. S. Kaufman, Introduction to Poly. Sci. & Tech., 1977, pp. 16, 17 and 40-43.

High Polymers, C. E. Schildknecht, ed., vol. XXIX, 1977, pp. 468-471, 494 and 495.

C. E. Schildknecht, "Polymerization Processes," High Polymers, vol. XXIX, Wiley, New York, 1977, p. 656.

R. Calendine, M. Palmer and P. Von Bramer, "Unsaturated Polyester from Recycled PET," Eastman Chem. Prod., Inc., Modern Plastics, May, 1980, pp. 64-70.

Encycl. of Chem. Tech., vol. 18, 1982, p. 580.

Eastman Chemicals Publication No. N-292A, Sep., 1983.

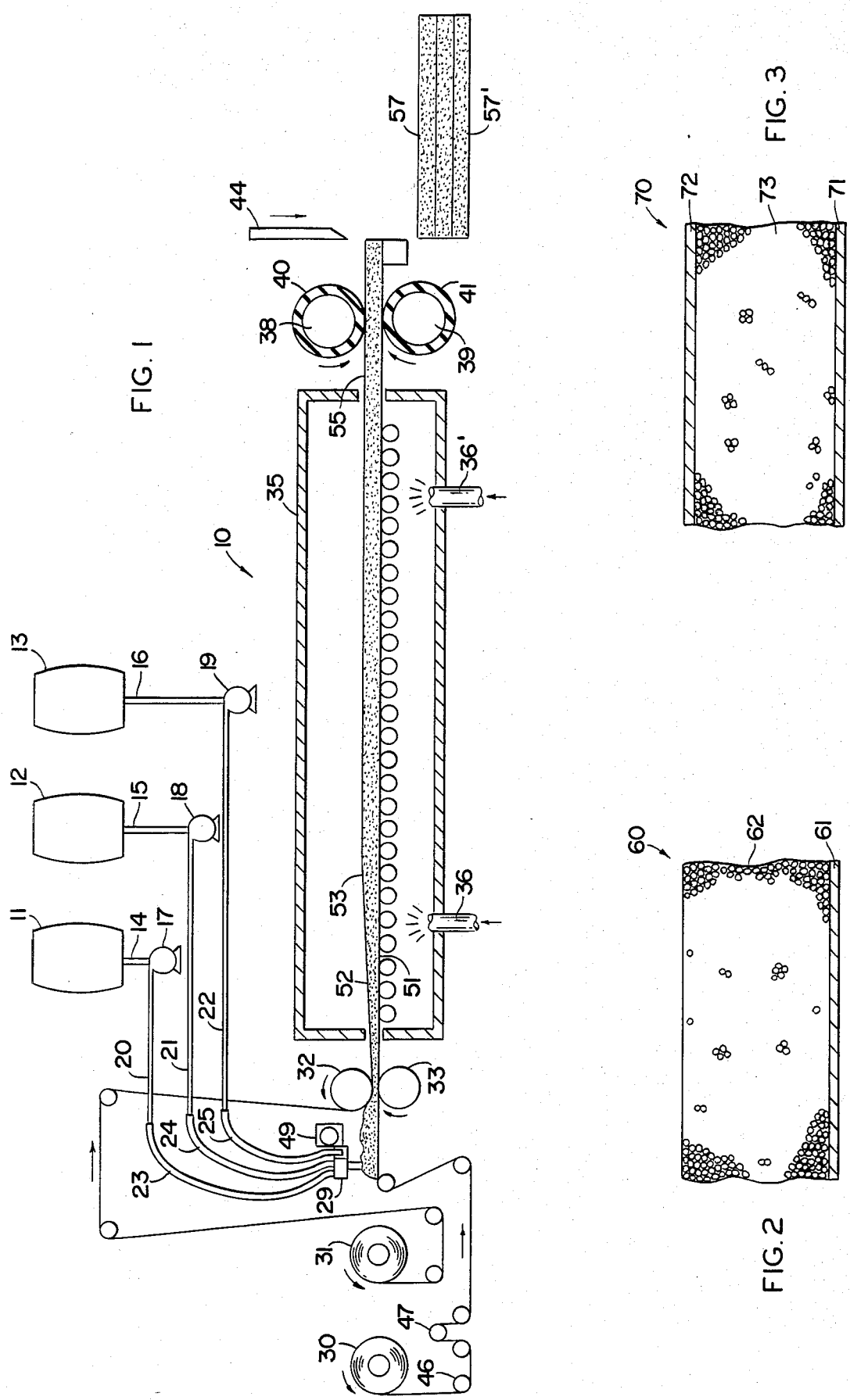

DIGESTION PRODUCTS OF POLYALKYLENE TEREPHTHALATE POLYMERS AND POLYCARBOXYLIC ACID-CONTAINING POLYOLS AND POLYMERIC FOAMS OBTAINED THEREFROM

BACKGROUND OF THE INVENTION

1. Field of the Invention

This invention relates to polyester polyols which are the hydroxyl-terminated digestion products of (a) polyalkylene terephthalate polymers and (b) polycarboxylic acid-containing polyols. The polyols are useful in the preparation of cellular foam materials, particularly polyisocyanurate and polyurethane foams.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

U.S. Pat. No. 4,039,487, for example, discloses the use of aromatic polyester polyols to prepare polyisocyanurate foams. Although the foams of this patent have good fire resistance and low smoke evolution upon combustion, they have a relatively high friability. Furthermore, the polyols are comparatively expensive to manufacture.

U.S. Pat. No. 4,092,276 also discloses the use of rather costly aromatic polyester polyols in preparing polyisocyanurate foams. Another disadvantage of these foams is that they do not have especially high compressive strength. A further problem with using aromatic polyester polyols, particularly those of low molecular weight, is that the polyols tend to be solid at room temperature, or to be characterized by very high viscosity and poor solubility in resin mixtures, thus making them difficult to handle.

To remedy the above drawbacks, it has been proposed in U.S. Pat. No. 4,237,238 to use in the preparation of polyisocyanurate foams a minor amount of a cheap by-product type of liquid polyol mixture which is obtained by the transesterification, with a glycol of molecular weight from about 60 to 400, of a dimethyl terephthalate esterified oxidate reaction product residue. The polyisocyanurate foams produced are disclosed to be characterized by a high degree of fire resistance with low smoke evolution on combustion, a low foam friability and reasonably good compressive strength.

Another source of aromatic polyester polyols is available through the recovery of polyester wastes. High molecular weight polyesters of terephthalic acid and aliphatic dihydric alcohols are well known in the art. These high molecular weight polyesters, especially polyethylene terephthalate (PET), are used commercially for the manufacture of packaging film, fibers, electrical insulators, molded articles, such as PET beverage bottles, etc. The various manufacturing processes unfortunately generate considerable waste as the polyester is processed into commercial form. Also, the tremendous quantities of spent consumer goods containing the polyester constitute a huge supply of scrap polyester material.

There is a growing awareness of the need for energy conservation and the utilization of recyclable materials. It is realized that the judicious use of plastics can contribute significantly to energy savings. The industry has long recognized that recycling waste polyalkylene terephthalate would conserve raw materials, improve process economics, and eliminate the problem of waste disposal. Numerous processes have been proposed for recovering useful products from waste or scrap polyalkylene terephthalate by reducing or digesting the high molecular weight polymer to short-chain fragments. These short-chain fragments have been used principally in the production of additional polyester materials.

The use of a polyalkylene terephthalate digestion product in flexible polyurethane foam is described in U.S. Pat. No. 4,048,104. In this patent, the digestion product is employed to prepare polyisocyanate prepolymers, and not as a polyol ingredient in the manufacture of flexible polyurethane foam.

U.S. Pat. No. 4,223,068 discloses the manufacture of rigid polyurethane foam wherein 5 to 30 percent of the weight of the organic polyol used in the manufacture is a digestion product of polyalkylene terephthalate residues or scraps digested with organic polyols. The preparation of isocyanurate modified polyurethane foams utilizing a digestion product of polyalkylene terephthalate scrap dissolved in one or more organic polyols is described in U.S. Pat. No. 4,417,001. While these foams are characterized by desirable physical properties, deficiencies have been encountered in the fluidity and storage stability of polyol digestion products disclosed for use in preparing the foams. These deficiencies lead to inefficiency in the foam production.

OBJECTS OF THE INVENTION

It is accordingly an object of the present invention to provide a storage stable polyol composition for use in preparing polymeric foam materials, particularly polyurethane and polyisocyanurate foams, of reduced friability and high thermal stability and compressive strength, and a method of producing the polyol composition.

It is another object of the present invention to provide improved cellular foams, especially polyisocyanurate and polyurethane foams, having a combination of advantageous properties, including a reduced friability and high thermal stability and compressive strength, and an improved method of producing the foams.

It is still another object of the present invention to produce an improved polyisocyanurate foam material characterized by a high degree of fire resistance with low smoke evolution and flame spread on combustion, and the formation of a protective char over unburnt foam upon combustion.

It is a further object of the present invention to provide polyisocyanurate foams which are characterized by a high conversion to trimer.

It is a still further object of the present invention to provide closed cell polyisocyanurate and polyurethane foam materials which can be used in building panels which are highly insulating, thermally resistant, low in friability, soundproof and self-supporting.

These and other objects and advantages of the present invention will become more apparent by reference to the following detailed description and drawings wherein:

FIG. 1 is a side schematic representation of an apparatus suitable for producing a cellular foam material in accordance with the present invention;

FIG. 2 is a cross-sectional view of a laminated building panel having one facing sheet; and FIG. 3 is a cross-sectional view of a laminated building panel having two facing sheets.

DESCRIPTION OF THE INVENTION

The above objects have been achieved and the drawbacks of the prior art have been overcome by the development of an improved polyester polyol, which is prepared by digesting polyalkylene terephthalate polymers with a polycarboxylic acid component-containing polyol, the polycarboxylic acid component having ring units with two

groups on adjacent or alternate ring positions, the ring unit content of the polycarboxylic acid component being sufficient for improved storage stability of the digestion product. A preferred digesting polyol of the invention contains o-phthalic, isophthalic and/or trimellitic acid residues. By o-phthalic, isophthalic and trimellitic acid residues are meant the groups

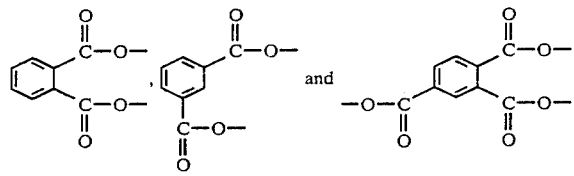

respectively. The polyalkylene terephthalate digestion products can be reacted with organic polyisocyanates in the presence of a blowing agent and catalyst to produce polyisocyanurate and polyurethane foams. The process of producing the foam benefits considerably from the fluidity and improved storage stability of the digestion products of the invention.

The polyalkylene terephthalate (principally polyethylene terephthalate) polymers to be digested are available in the form of films, fibers, and shaped articles. In addition, polyalkylene terephthalate polymers are available as sludges which are obtained as cleanup by-products from polyalkylene terephthalate manufacturing plants. The waste or scrap polyalkylene terephthalate contains recurring units of the formula

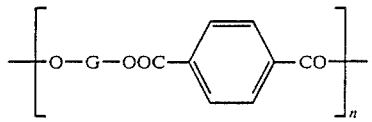

wherein G represents a divalent organic radical containing from 2 to 10 carbon atoms attached to the adjacent oxygen atoms by saturated carbon atoms. In polyethylene terephthalate G is $-C_2H_4-$. The molecular weight of such polyalkylene terephthalate polymers is at least about 15,000 and ranges upward to 100,000 or more. Lower molecular weight oligomers of the polyalkylene terephthalates also can be used.

According to the present invention the polyalkylene terephthalate polymers are digested or degraded with a digesting medium comprising a polycarboxylic acid component-containing polyol. The digesting medium may comprise a polyol and a polycarboxylic acid or acid derivative, such as an anhydride or ester of the polycarboxylic acid. The ingredients can be introduced in various ways in the digesting process. For example, all ingredients can be charged at the same time to the reacting vessel and thereupon reacted together. In an alternative method, the polyalkylene terephthalate first is reacted with a polyol, and the polycarboxylic acid or acid derivative thereof subsequently is added to the reactor and the reaction continued to completion. Various mixtures of digesting reactants, such as mixtures of diols, like diethylene or dipropylene glycol, and polyester polyols, like reaction products of mixtures of phthalic anhydride and said diols, can be introduced together to the reactor.

The polyols of the digesting medium desirably are low molecular weight polyols which can be aliphatic, cycloaliphatic, aromatic, araliphatic and/or heterocyclic, and are preferably selected from the group consisting of diols and triols. Advantageously, alkoxylated triols are employed. More preferably, the polyol is an aliphatic dihydric alcohol which desirably has from 2 to 16 carbon atoms. The molecular weight of the digesting polyol advantageously ranges from about 60 to about 500. Examples of suitable diols include alkylene glycols and glycol ethers, such as ethylene, oxydiethylene, propylene, oxydipropylene, butylene, pentylene, hexylene, and octamethylene glycols, and isomeric forms thereof, and the polyoxyalkylene glycols such as polyoxyethylene and polyoxypropylene glycols, 1,4-bis-hydroxymethyl cyclohexane, dimethylol dicyclopentadiene, 1,3-cyclohexanediol, 1,4-cyclohexanediol, and in general hydroxy-terminated ethers or mixed ether esters having a molecular weight of about 500 or less. The digesting polyols may, of course, be used as mixtures of two or more polyols. The polyols may include substituents which are inert in the digestion reaction, for example, chlorine and bromine substituents. Preferred polyols are polyoxyethylene glycols, diethylene glycol and dipropylene glycol, with the latter two glycols being especially suitable.

The digesting medium must contain a polycarboxylic acid or acids, or derivatives thereof, having an effective amount of the above-described ring residues for storage stability improvement of the resulting digestion product. The acid compounds containing the ring residues may be aromatic, cycloaliphatic, araliphatic and/or heterocyclic compounds, and preferably are aromatic. In addition to the two requisite

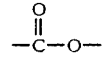

groups, the acid compounds may have additional

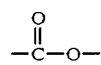

groups or —OH groups, and further may include substituents which are inert in the digestion reaction, for example, chlorine and bromine substituents.

Polycarboxylic acids or acid derivatives introduced in the digestion or depolymerization will be converted to esters during the process. Alternatively, the acids or acid derivatives can be pre-reacted to form esters and these esters then introduced in the depolymerization.

Examples of ring residue-containing acid compounds are phthalic anhydride, isophthalic acid, trimellitic anhydride, tetrahydrophthalic anhydride, tetrachlorophthalic anhydride, tetrabromophthalic anhydride, 1,4,5,6,7,7-hexachloro-5-norbornene-2,3-dicarboxylic anhydride, and 1,8-naphthalic anhydride. Besides the ring residue-containing acid compounds, other polybasic-carboxylic acid components may be used in the depolymerization. The optional polybasic-carboxylic acids may be aliphatic, cycloaliphatic, aromatic, araliphatic and/or heterocyclic and may be substituted, for example, with halogen atoms and/or may be unsaturated. The following are mentioned as examples: succinic acid, adipic acid, suberic acid, azelaic acid, sebacic acid, glutaric acid anhydride, maleic acid, maleic acid anhydride, fumaric acid, and dimeric and trimeric fatty acids, such as oleic acid, optionally mixed with monomeric fatty acids.

The digestion of the polyalkylene terephthalate polymer is conveniently carried out under normal depolymerization conditions well known and described in the prior art. Illustratively, the digestion or depolymerization can be conducted in the absence of a liquid reaction medium composed of material other than the digesting ingredients. The reaction suitably is performed under a flow of nitrogen and at atmospheric pressure and temperatures from about 150° C. to about 250° C. for a period from about one hour to about ten hours. The digestion reaction can be carried out as a batch process or continuously, and is normally catalyzed. Generally, enough depolymerization or transesterification catalyst is added to the reaction mixture to suitably promote the reaction. Any conventional transesterification catalyst (single compound or mixture of compounds) can be used.

The depolymerization may be initiated by reacting the polyalkylene terephthalate material (e.g., polyethylene terephthalate) with a polyol, such as diethylene and/or dipropylene glycol, in the presence of a catalyst, such as tetrabutyl titanate, until a solution of the polyalkylene terephthalate is obtained. Then the acid component, such as phthalic anhydride, or an ester thereof, such as the product of a catalyzed esterification reaction between phthalic anhydride and diethylene and/or dipropylene glycol, is added and the depolymerization is completed. The proportions of polyalkylene terephthalate to polyol to acid or derivative thereof may be varied to a considerable degree in accordance with the product desired. At all events, sufficient polyol and acid component should be used to form a polyester polyol having long-term storage stability and capable of efficiently polymerizing with organic polyisocyanates in the formation of rigid foams.

In a preferred embodiment of the invention, the depolymerization of polyethylene terephthalate (PET), which is composed of repeating ethylene glycol (EG) and terephthalic acid (TPA) molecules connected by ester linkages, is accomplished by digesting the polymer with the digesting polyol, preferably diethylene glycol (DEG), and the polycarboxylic acid component, preferably phthalic anhydride (PA). In this digestion, suitable molar proportions of reactants may be as follows:

Moles of total polyol (digesting polyol, preferably DEG, +EG) to total acid (TPA+polycarboxylic acid component, preferably PA)=1.5-6, preferably 2.1-2.6, to 1

Moles of PET to polycarboxylic acid component, preferably PA=1.5-3.5, preferably 2.4-3.5, to 1

Moles of digesting polyol, preferably DEG, to EG=1.8-2.5 to 1.

Since the enhanced storage stability of the polyol digestion product is attributable to the presence of the ring unit-containing polycarboxylic acid component in the digesting medium, much lower PET:polycarboxylic acid component mole ratios, with an accompanying increase, if desired, in the amount of digesting polyol to maintain the equivalent weight, may of course be employed. However, the cost of the digestion product increases with increasing content of the stabilizing acid component. In an especially preferred digestion product from a commercial standpoint, the molar proportions are as follows:

Moles of total polyol (digesting polyol, preferably DEG, +EG) to total acid (TPA+polycarboxylic acid component, preferably PA)=2.6 to 1

Moles of PET to polycarboxylic acid component, preferably PA=3.1 to 1

Moles of digesting polyol, preferably DEG, to EG=2.5 to 1.

The digestion process is considered to be substantially complete when a solution of the sample being digested is formed. However, some polyalkylene terephthalate materials contain dispersed solids which can be catalyst particles (left over from the processing by which the terephthalate was produced); or may be pigments or other foreign substances. Such dispersed solids may remain in the digestion product, so long as they are substantially inert in the subsequent preparation of rigid polymeric foam.

Although the digested polyol mixture of the invention generally can be employed without being filtered, it is also possible to filter this mixture prior to its subsequent utilization in foam preparations.

The properties of the digested polyol mixtures of the present invention fall within rather broad ranges because of the variable nature of the polyalkylene terephthalate materials themselves. Accordingly, the viscosities (Brookfield) of the digested polyol mixtures measured in cps. at 25° C. fall within a rather broad range from about 500 to about 50,000, preferably about 600 to about 20,000, and most preferably about 700 to about 12,000; the hydroxyl number values fall within a range of from about 700 to about 120, preferably about 250 to about 600, and most preferably from about 300 to about 475; the acid number falls within a range of from about 0.2 to about 20 and preferably about 0.2 to about 10.

A most preferred digested polyol mixture of the invention is characterized by a viscosity in cps. at 25° C. of about 700 to about 12,000, a free diethylene glycol content of from about 8 to about 30 percent by weight of said mixture, a free ethylene glycol content of from about 2 to about 8 percent by weight of said mixture, a hydroxyl number within a range of from about 300 to about 475, and an acid number of about 0.2 to about 10.

The polyol mixtures of the present invention may be used in the preparation of both cellular and non-cellular polymers. The latter polymers, such as the polyisocyanurates and polyurethanes, can be prepared by using standard techniques known to those skilled in the art. The polyol mixtures are particularly useful in the preparation of polyisocyanurate foams and polyurethane foams. These foams can be prepared by mixing together the organic polyisocyanate with the polyol, catalyst and blowing agent at temperatures ranging from about 0° C. to 150° C.

The polyurethane foams can be prepared by reacting the polyol mixture of the invention and polyisocyanate on an essentially 1:1 to 1:1.2 equivalent basis. In an advantageous embodiment of the invention, the polyol mixture of the invention is employed in admixture with at least one other polyol to produce polyurethane foams. In this embodiment, the polyol mixture of the invention can comprise about 5 to 100, preferably about 20 to 50, weight percent of the total polyol content in the foam preparations. The polyisocyanurate foams of the invention are prepared by reacting the polyisocyanate with a minor amount of polyol, wherein the polyol digestion mixture comprises about 5 to 100 weight percent of the total polyol content in the foam preparations.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

The polyols which can be employed in combination with the polyol mixture of the invention in the preparation of the polyurethane and polyisocyanurate foam compositions include, for example, monomeric polyols, such as ethylene glycol, the oxyalkylene adducts of polyol bases wherein the oxyalkylene portion is derived from a monomeric unit such as ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

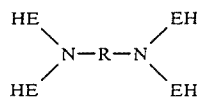

wherein R is an alkylene radical containing at least 2 to 6 carbon atoms and E is a polyoxyalkylene chain; amine based polyethers of the formula:

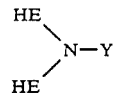

wherein E is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphinic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus, the polyether polyols which can be employed in the present invention include oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups, preferably about 2 to 4 terminal hydroxyl groups. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used in combination with the polyol mixture of the invention. These can be obtained from the reaction of polycarboxylic acids and polyhydric alcohols. Such suitable polycarboxylic acids may be oxalic acid, malonic acid, succinic acid, glutaric acid, adipic acid, pimelic acid, suberic acid, azelaic acid, sebacic acid, basillic acid, thapsic acid, maleic acid, fumaric acid, glutaconic acid, isophthalic acid and terephthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,4-hexanediol, glycerol, trimethylolpropane, trimethylolethane, hexane 1,2,6-triol, α-methylglucoside, pentaerythritol, sorbitol, sucrose, and compounds derived from phenols such as 2,2-bis(4-hydroxyphenol) propane.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

Any blowing agent typically employed in similar prior art foam products containing polyisocyanurate and/or polyurethane linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, CCl$_2$FCClF$_2$, CCl$_2$FCF$_3$, dichlorofluoromethylether, isopropyl ether, n-pentane, cyclopentane, and 2-methylbutane. Trichlorofluoromethane is a preferred blowing agent. The blowing agents are employed in an amount sufficient to give the resultant foam the desired bulk density which is generally between 0.1 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. No. 4,365,024 and U.S. application Ser. No. 490,279, filed May 2, 1983. Generally, the surfactant comprises from about 0.05 to 10, and preferably from 0.1 to 6, weight percent of the foam-forming composition.

Any of the catalysts conventionally employed in the art to catalyze the reaction of an isocyanate with a reactive hydrogen containing compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N',N'-tetramethyl-1,3-butanediamine, N,N-dimethylethanolamine, N,N-diethylethanolamine, and the like. The catalysts generally comprise from 0.1 to 20, and preferably from 0.3 to 10, weight percent of the total composition.

Other additives may also be included in the foam formulations. Included are flame retardants, such as tris(2-chloroethyl)-phosphate, dispersing agents, plasticizers, fillers and pigments.

In a preferred rigid foam of the invention containing polyisocyanurate linkages, the organic polyisocyanate is polymethylene polyphenylisocyanate. The polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

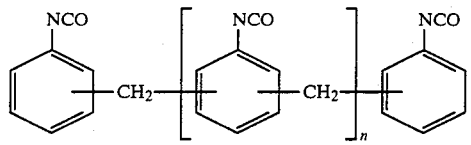

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

In order to ensure complete reaction, the polymethylene polyphenylisocyanate and the polyol are generally mixed in an equivalent ratio of 1.5:1 to 6:1 and preferably 2:1 to 5:1. In ranges outside these proportions the reaction yields a product having undesirable physical characteristics. At higher ratios the product has an undesirably high friability. At lower ratios the product has an undesirably high flammability.

In the preparation of these polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris(dimethylaminomethyl)phenol, and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Referring now to the drawings, and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In the production of a laminate of a polyisocyanurate foam, the isocyanate tank 11 is charged with the organic polyisocyanate admixed with the blowing agent and the surfactant, and the polyol tank 12 is charged with the polyol mixture of the invention, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. Alternatively, lines 21 and 22 can be combined prior to the mixing head. The pull rolls 38, 39, each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol mixture and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the oven 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

Preparation of Polyol from Polyethylene Terephthalate

This example illustrates the preparation of a digested polyol mixture of the present invention.

To a 50 reactor fitted with a mechanical stirrer, a thermometer, a reflux condenser, an inlet and outlet for nitrogen, and a heating mantel were added 25,300 g of diethylene glycol and 10 g of tetrabutyl titanate. The ingredients were heated to 220° C., and 18,800 g of polyethylene terephthalate scrap in the form of pellets were added to the kettle over a period of 2.5 hr. 4,500 g of phthalic anhydride were added to the resulting solution, and the ingredients were heated at 240° C. for 3 hours. The water formed was removed from the reactor during the course of the reaction.

The resultant polyol mixture had an acid number of 1.4, a viscosity of 1250 cps at 25° C., a free diethylene glycol content of 19.06%, a free ethylene glycol content of 3.66%, and a hydroxyl number of 439.5.

EXAMPLE 2

This example illustrates the synthesis of a rigid polyisocyanurate foam utilizing the digested polyol mixture of Example 1.

In the preparation of the foam, the following quantities of the following ingredients were combined as indicated.

| Item | Ingredient | Parts by Weight |
| --- | --- | --- |
| A | Polymethylene polyphenyl isocyanate | 242.0 |
| B | $CFCl_3$ | 55.5 |
| C | Surfactant | 2.5 |
| D | Polyol mixture of Example 1 | 70.0 |
| E | 2,4,6-tris (dimethylaminomethyl) phenol | (See below) |
| F | Potassium-2-ethyl hexoate (70% solution in G) | (See below) |
| G | Polyoxyethylene glycol | (See below) |

The foam was prepared using a Hennecke foam metering and dispensing machine. Items A, B and C were premixed together, metered and injected into one side of the high pressure impingement mixing chamber of the machine. Items E, F and G were premixed together in a container. 7.8 parts of this catalyst mixture, and a metered amount of item D were injected into the other side of the high pressure impingement mixing chamber. After mixing, all ingredients were dispensed into an appropriate container, yielding a polyisocyanurate foam.

In the above synthesis, Item A is a polymethylene polyphenyl isocyanate having an equivalent weight of 138, an acidity of 0.03% HCl, and a viscosity of 2000 centipoises at 25° C. and is available from the Mobay Chemical Company, Pittsburgh, Pa. under the trade name MONDUR MR-200.

Item C is the surfactant supplied by Jim Walter Resources, Inc. under the trade name Foamstab 100.

Item E is that supplied by the Rohm & Haas Chemical Company under the trade name DMP-30.

Item F is employed in the form of a 70 weight % solution in the polyoxyethylene glycol (Item G) sold by the Union Carbide Corporation under the trade name Carbowax 200.

The catalyst mixture of Items E, F and G added in the above-described foam preparation is a blend of DMP-30: potassium-2-ethyl hexoate: polyoxyethylene glycol in a 0.84:2.50:6.66 weight ratio.

The following properties of the foam were determined:

| Cream Time, sec | 19 | |
|---|---|---|
| Firm Time, sec | 47 | |
| Density, core, pcf | 2.10 | |
| k-factor, initial, Btu-in/hr-ft$^2$-°F. | 0.107 | |
| k-factor, after 30 days, Btu-in/hr-ft$^2$-°F. | 0.147 | |
| Oxygen Index[1] | 24.5 | |
| % Closed Cells[2] | 89 | |
| Compressive Strength, psi Parallel to rise (at yield)[3] | 36 | |
| Flexural Strength, psi[4] | 36 | |
| Friability (% wt. loss)[5] | 7 | |
| % Volume Change[6] | 110° C. | 125° C. |
| 1 day | 0.2 | 0.9 |
| 3 days | 1.2 | 2.1 |
| 7 days | 1.3 | 2.4 |
| 14 days | 1.5 | 2.7 |
| 21 days | 1.9 | 3.0 |
| 28 days | 1.8 | 3.0 |
| Tunnel Test[7] | | |
| Flame Spread | 24.6 | |
| Smoke | 91 | |

[1]Flammability test conducted according to ASTM D-2863-70, except that a sample measuring ½" × ½" × 6" was used.
[2]According to ASTM Test Method D-2856-70.
[3]According to ASTM Test Method D-1621-73.
[4]According to ASTM Test Method C-203.
[5]According to ASTM Test Method C-421.
[6]According to ASTM Test Method D-2126.
[7]According to ASTM Test Method E-84, 2 in thick sample (U.L.)

EXAMPLE 3

Preparation of Polyol from Polethylene Terephthalate

This example illustrates the digestion of ¼ in ground polyethylene terephthalate bottle scrap to produce a digested polyol mixture of the present invention.

To a 50 l reactor fitted with a mechanical stirrer, a thermometer, a reflux condenser, an inlet and outlet for nitrogen, and a heating mantel were added 25,300 g of diethylene glycol and 10 g of tetrabutyl titanate. After the ingredients were heated to 220° C., 18,000 g of the polyethylene terephthalate scrap were added to the digestion reactor. To this mixture were added 4,500 g phthalic anhydride and the ingredients then were maintained at 220° C. for 1 hr. The water formed was removed from the reactor during the course of the reaction.

The resulting liquid product was poured through a 297 micron screen and vacuum filtered to remove fine particles therefrom. The polyol mixture had a hydroxyl number of 460.

EXAMPLE 4

This example illustrates the synthesis of a rigid polyurethane foam utilizing the digested polyol mixture of Example 3.

In the preparation of the foam, the following quantities of the following ingredients were combined as indicated.

| Item | Ingredient | Parts by Weight |
|---|---|---|
| A | Polymethylene polyphenyl isocyanate | 156.0 |
| B | Sucrose amine polyol | 70.0 |
| C | Polyol mixture of Example 3 | 30.0 |
| D | Flame retardant | 13.0 |
| E | CFCl$_3$ | 48.0 |
| F | Surfactant | 2.0 |
| G | Amine catalyst | 1.0 |
| H | Tin catalyst | 0.7 |

The foam was prepared using a Martin-Sweets Machine. A large batch of polyol premix was prepared by mixing together Items B, C, D, E, F and G, and cooling the resulting mixture to 15° C. In the foam synthesis, 156.0 parts of Item A at a temperature of 15° C. were charged to the mixing chamber of the Martin-Sweets Machine. Simultaneously, 164.0 parts of the polyol premix at a temperature of 15° C. were charged to the mixing chamber, along with 0.7 part of Item H. The ingredients were mixed at 5000 rpm, and thereafter deposited into a box to yield a rigid polyurethane foam.

In the above synthesis, Item A is a polymethylene polyphenyl isocyanate having a viscosity of 150-250 centipoises at 25° C. and is available from the Mobay Chemical Corporation, Pittsburgh, Pa. under the trade name Mondur MR.

Item B is that supplied by the Olin Corporation under the trade name Poly G-71-530.

Item D is that supplied by the Stauffer Chemical Corporation under the trade name Fyrol 6.

Item F is the surfactant supplied by Jim Walter Resources, Inc. under the trade name Foamstab 110.

Item G is that supplied by Abott Laboratories under the trade name Polycat 8.

Item H is that supplied by Cincinnati Milacron under the trade name Advastab TM 181.

The following properties of the foam were determined:

| Cream Time, sec | 19 |
|---|---|
| Tack Free Time, sec | 112 |
| Density, core, pcf | 1.64 |
| k-factor, initial, Btu-in/hr-ft$^2$-°F. | 0.140 |
| k-factor, after 30 days, Btu-in/hr-ft$^2$-°F. | 0.152 |
| Oxygen Index[1] | 23.3 |
| % Closed Cells[2] | 90 |
| Compressive Strength, psi | 32 |

-continued

| | |
|---|---|
| Parallel to rise (at yield)[3] | |
| Flexural Strength, psi[4] | 30 |
| Friability (% wt. loss)[5] | 5.1 |
| Tunnel Test[6] | |
| Flame Spread | 80 |
| Smoke | 315 |

[1]Flammability test conducted according to ASTM D-2863-70, except that a sample measuring 1/4" × 1/4" × 6" was used.
[2]According to ASTM Test Method D-2856-70.
[3]According to ASTM Test Method D-1621-73.
[4]According to ASTM Test Method C-203.
[5]According to ASTM Test Method C-421.
[6]According to ASTM Test Method E-84, 2 in thick sample (U.L.)

We claim:

1. A polyisocyanurate foam comprising the reaction product of an organic polyisocyanate, a blowing agent, a trimerization catalyst, and a minor amount of a polyol, wherein from about 5 to 100 weight percent of the Polyol comprises the reaction product obtained by digesting polyalkylene terephthalate with a digesting medium comprising a polycatboxylic acid component-containing polyol derived from the polycarboxylic acid component and a digesting polyol component, wherein the polycarboxylic acid component has ring units with two

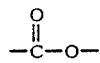

groups on adjacent of alternate ring positions, the ring unit content of the polycarboxylic acid component being sufficient for improved storage stability of the digestion product.

2. A process for producing the polyisocyanutate foam of claim 1 comprising reacting together under foam-forming conditions an organic polyisocyanate, a blowing agent, a trimerization catalyst, and a minor amount of a polyol, wherein from about 5 to 100 weight percent of the polyol comprises the reaction product obtained by digesting polyalkylene terephthalate with a digesting medium comprising a polycarboxylic acid component-containing polyol derived from the polycarboxylic acid component and a digesting polyol component, wherein the polycarboxylic acid component has ring units with two

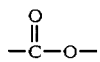

groups on adjacent or alternate ring positions, the ring unit content of the polycarboxylic acid component being sufficient for improved storage stability of the digestion product.

3. A polyurethane foam comprising the reaction product of an organic polyisocyanate, a blowing agent, a catalyst and a polyol, wherein from about 5 to 100 weight percent of the polyol comprises the reaction product obtained by digesting polyalkylene terephthalate with a digesting medium comprising a polycarboxylic acid component-containing polyol derived from the polycarboxylic acid component and a digesting polyol component, wherein the polycarboxylic acid component has ring units with two

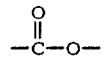

groups on adjacent or alternate ring positions, the ring unit content of the polycarboxylic acid component being sufficient for improved storage stability of the digestion product.

4. A process for producing the polyurethane foam of claim 3 comprising reacting together under foam-forming conditions an organic polyisocyanate, a blowing agent, a datalyst and a polyol, wherein from about 5 to 100 weight percent of the polyol comprises the reaction product obtained by digesting polyalkylene terephthalate with digesting medium comprising a polycarboxylic acid component-containing polyol derived from the polycarboxylic acid component and a digesting polyol component, wherein the polycarboxylic acid component has ring units with two

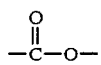

groups on adjacent or alternate ring positions, the ring unit content of the polycarboxylic acid component being sufficient for improved storage stability of the digestion product.

5. A laminate comprising at least one facing sheet adhered to the polyisocyanurate foam of claim 1 which comprises the reaction product of an organic polyisocyanate, a blowing agent, a trimerization catalyst, and a minor amount of a polyol, wherein from about 5 to 100 weight percent of the polyol comprises the reaction product obtained by digesting polyalkylene terephthalate with a digesting medium comprising a polycarboxylic acid component-containing polyol derived from the polycarboxylic acid component and a digesting polyol component, wherein the polycarboxylic acid component has ring units with two

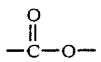

groups on adjacent or alternate ring positions, the ring unit content of the polycarboxylic acid component being sufficient for improved storage stability of the digestion product.

6. The laminate of claim 5 wherein said polyisocyanurate foam is reinforced by glass fibers.

7. A process for producing the laminate of claim 5 comprising
  (a) contacting at least one facing sheet with a polyisocyanurate foam-forming mixture comprising an organic polyisocynate, a blowing agent, a trimerization catalyst, and a minor amount of a polyol, wherein from about 5 to 100 weight percent of the polyol comprises the reaction product obtained by digesting polyalkylene terephthalate with a digesting medium comprising a polycarboxylic acid component-containing polyol derived from the polycarboxylic acid component and a digesting polyol component, wherein the polycarboxylic acid component has ring units with two

groups on adjacent or alternate ring positions, the ring unit content of the polycarboxylic acid component being sufficient for improved storage stability of the digestion product, and (b) foaming said foam-forming mixutre.

8. A laminated comprising at least one facing aheet adhered to the polyurethane foam of claim 3 which comprises the reaction product of an organic polyisocyanate, a blowing agent, a catalyst and a polyol, wherein from about 5 to 100 weight percent of the polyol comprises the reaction product obtained by digesting polyalkylene terephthalate with a digesting medium comprising a polycarboxylic acid component-containing polyol derived from the polycarboxylic acid component and a digesting polyol component, wherein the polycarboxylic acid component has ring units with two

groups on adjacent or alternate ring positions, the ring unit content of the polycarboxylic acid component being sufficient for improved storage stability of the digestion product.

9. The laminate of claim 8 wherein said polyurethane foam is reinforced by glass fibers.

10. A process for producing the laminate of claim 8 comprising (a) contacting at least one facing sheet with a polyurethane foam-forming mixture comprising an organic polyisocyanate, a blowing agent, a catalyst add a polyol, wherein from about 5 to 100 weight percent of the polyol comprises the reaction product obtained by digesting polyalkylene terephthalate with a digesting medium comprising a polycarboxylic acid component-containing containing polyol derived from the polycarboxylic acid component and a digesting polyol component, wherein the polycarboxylic acid component has ring units with two

groups on adjacent or alternate ring positions, the ring unit content of the polycarboxylic acid component being sufficient for improved storage stability of the digestion product, and (b) foaming said foam-forming mixture.

11. The polyisocyanurate foam of claim 1 wherein said digesting polyol component is an aliphatic dihydric alcohol having 2 to 16 carbon atoms.

12. The polyisocyanutate foam of claim 11 wherein said aliphatic dihydric alcohol is a member selected from the group consisting of diethylene glycol, dipropylene glycol, mixtures of said glycols, and mixtures of said glycols with a member selected from the group consisting of ethylene glycol, propylene glycol and mixtures thereof.

13. The polyisocyanurate foam of claim 1 wherein said polycarboxylic acid component has aromatic ring units with two

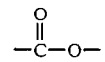

groups on adjacent or alternate ring positions.

14. The polyisocyanurate foam of claim 1 wherein said polycarboxylic acid component is a member selected from the group consisting of phthalic anhydride, phthalic acid, isophthalic acid, trimellitic anhydride, trimellitic acid, esters of said polycarboxylic acid components and mixtures thereof.

15. The polyisocyanurate foam of claim 14 wherein said digesting polyol component is an alihphatic dihydric alcohol having 2 to 16 carbon atoms.

16. The polyisocyanurate foam of claim 15 wherein said aliphatic dihydric alcohol is a member selected from the group consisting of diethylene glycol, dipropylene glycol, mixtures of said glycos, and mixtures of said glycols with a member selected from the group consisting of ehtylene glycol, proplylene glycol, and mixtures thereof.

17. The polyisocyanurate foam of claim 16 wherein said polyalkylene terephthalate is polyethylene terephthalate and said polycarboxylic acid component is a member selected from the group consisting of phthalic anhydride, esters of phthalic anhydride and mixtures thereof.

18. The polyisocyanurate foam of claim 17 wherein said aliphatic dihydride alcohol is diethylene glycol.

19. The polyisocyanurate foam of claim 18 wherein said digestion product is characterized by a viscosity in cps, at 25° C. of about 700 to about 12,000, a free diethylene glycol content of from about 8 to about 30 percent by weight of said digestion product, a free ethylene glycol content of from about 2 to about 8 percent by weight of said digestion product, a hydroxyl number within a range of from about 300 to about 475, and an acid number of about 0.2 to about 10.

20. The polyisocyanurate foam of claim 1 wherein said polyalkylene terephthalate is polyethylene terephthalate, and in the digestion reaction the ratio of moles of said digesting polyol component plus moles of ehtylene glycol in said polyethylene terephthalate to moles of said polycarboxylic acid component of the digesting medium plus moles of terephthalic acid in said polyehtylene terephthalate is 1.5–6 to 1, the ratio of moles of said polyethylene terephthalate to moles of said polycarboxylic acid component of the digesting medium is 1.5–3.5 to 1, and the ratio of moles of said digesting polyol component to moles of said ethylene glycol in said polyethylene terephthalate is 1.8–2.5 to 1.

21. The polyisocyanurate foam of claim 20 wherein said polycarboxylic acid component has aromatic ring units with two

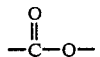

groups on adjacent or alternate ring positions.

22. The polyisocyanurate foam of claim 21 wherein said digesting polyol component is an aliphatic dihydric alcohol having 2 to 16 carbon atoms.

23. The polyisocyanurate foam of claim 22 wherein said polycarboxylic acid component is a member selected from the group consisting of phthalic anhydride, phthalic acid, isophthalic acid, trimellitic anhydride, trimellitic acid, esters of said polycarboxylic acid components and mixtures thereof.

24. The polyisocyanurate foam of claim 23 wherein said aliphatic dihydric alcohol is a member selected from the group consisting of diethylene glycol, dipropylene glycol, mixtures of said glycols, and mixtures of said glycols with a member selected from the group consisting of ehtylene glycol, propylene glycol, and mixtures thereof.

25. The polyisocyanurate foam of claim 24 wherein said polycarboxylic acid component is a member selected from the group consisting of pththalic anhydride, esters of phthalic anhydride and mixtures thereof.

26. The polyisocyanurate foam of claim 25 wherein said aliphatic dihydric alcohol is diethylene glycol.

27. The polyisocyanurate foam of claim 1 wherein said polyakylene terephthalate is polyethylene terephthalate, and in the digestion reaction the ratio of moles of said digesting polyol component plus moles of ehtylene glycol in said polyethylene terephthalate to moles of said polycarboxylic acid component of the digesting medium plus moles of terephthalic acid in said polyethylene terephthalate is 2.1–2.6 to 1, the ratio of moles of said polyethlene terephthalate to moles of said polycarboxylic acid component of the digesting medium is 2.4–3.5 to 1, and the ratio of moles of said digesting polyol component to moles of said ehtylene glycol in said polyethylene terphthalate is 1.8–2.5 to 1.

28. The polyisocyanurate foam of claim 27 wherein said polycarboxylic acid component has aromatic ring units with two

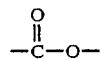

groups on adjacent or alternate ring positions, and said digesting polyol component is an aliphatic dihydric alcohol having 2 to 16 carbon atoms.

29. The polyisocyanurate foam of claim 28 wherein said polycarboxylic acid component is a member selected from the group consisting of phthalic anhydride, phthalic acid, isophthalic acid, trimellitic anhydride, trimellitic acid, esters of said polycarboxylic acid components and mixtures thereof, and said aliphatic dihydric alcohol is a member selected from the group consisting of diethylene glycol, diproplene glycol, mixtures of said glycols, and mixtures of said glycols with a member selected from the group consisting of ethylene glycol, propylene glycol, and mixtures thereof.

30. The polyisocyanurate foam of claim 29 wherein said polycarboxylic acid component is a member selected from the group consisting of phthalic anhydride, esters of phthalic anhydride and mixtures thereof, and said aliphatic dihydric alcohol is diethylene glycol.

31. The polyisocyanurate foam of claim 30 wherein in the digestion reaction the ratio of moles of said diethylene glycol plus moles of ethylene glycol in said polyethylene terepohthalate to moles of said phthalic anhydride plus moles of terephthalic acid in said polyethylene terephthalate is 2.6 to 1, the ratio of moles of said polyethylene terephthalate to moles of said phthalic anhydride is 3.1 to 1, and the ratio of moles of said diethylene glycol to moles of said ehtylene glycol is 2.5 to 1.

32. The polurethane foam of claim 3 wherein said digesting polyol component is an aliphatic dihydric alcohol having 2 to 16 carbon atoms.

33. The polyurethane foam of claim 32 wherein said aliphatic dihydric alcohol is a member selected from the group consisting of diethylene glycol, dipropylene glycol, mixtures of said glycols, and mixtures of said glycols with a member selected from the group consisting of ethylene glycol, propylene glycol, and mixtures thereof.

34. The polyurethane foam of claim 3 wherein said polycarboxylic acid component has aromatic ring units with two

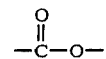

groups on adjacent or alternate ring positions.

35. The polyurethane foam of claim 3 wherein said polycarboxylic acid component is a member selected from the group consisting of phthalic anhydride, phthalic acid, isophthalic acid, trimellitic anhydride, trimellitic acid, esters of said polycarboxylic acid components and mixtures thereof.

36. The polyurethan foam of claim 35 wherein said digesting polyol component is an aliphatic dihydric alcohol having 2 to 16 carbon atoms.

37. The polyurethan foam of claim 36 wherein said aliphatic dihydric alcohol is a member selected from the group consisting of diethylene glycol, dipropylene glycol, mixtures of said glycols, and mixtures of said glycols with a member selected from the group consisting of ehtylene glycol, propylene glycol, and mixtures thereof.

38. The polyurethan foam of claim 37 wherein said polyalkylene terephthalate is polyethylene terephthalate and said polycarboxylic acid component is a member selected from the group consisting of phthalic anhydride, esters of phthalic anhydride and mixtures thereof.

39. The polyurethane foam of claim 38 wherein said aliphatic dihydric alcohol is diethylene glycol.

40. The polyurethane foam of claim 39 wherein said digestion product is characterized by a viscosity in cps, at 25° C. of about 700 to about 12,000, a free diethylene glycol content of from about 8 to about 30 percent by weight of said digestion product, a free ethylene glycol content of from about 2 to about 8 percent by weight of said digestion product, a hydroxyl number within a range of from about 300 to about 475, and an acid number of about 0.2 to about 10.

41. The polyurethane foam of claim 3 wherein said polyalkylene terephthalate is polyethylene terephthalate, and in the digesting reaction the ratio of moles of said digesting polyol component plus moles of ethylene glycol in said polyethylene terephthalate to moles of said polycarboxylic acid component of the digesting medium plus moles of terephthalic acid in said polyethylene terephthalate is 1.5–6 to 1, the ratio of moles of said polyethylene terephthalate to moles of said polycarboxylic acid component of the digesting medium is 1.5–3.5 to 1, and the ratio of moles of said digesting polyol component to moles of said ethylene glycol in said polyethylene terephthalate is 1.8–2.5 to 1.

42. The polyurethane foam of claim 41 wherein said polycarboxylic acid component has aromatic ring units with two

groups on adjacent or alternate ring positions.

43. The polyurethane foam of claim 42 wherein said digesting polyol component is an aliphatic dihydric alcohol having 2 to 16 carbon atoms.

44. The polyurethane foam of claim 43 wherein said polycarboxylic acid component is a member selected from the group consisting of phthalic anhydride, phthalic acid, isophthalic acid, trimellitic anhydride, trimellitic acid, esters of said polycarboxylic acid components and mixtures thereof.

45. The polyurethan foam of claim 44 wherein said aliphatic dihydric alcohol is a member selected from the group consisting of diethylene glycol, dipropylene glycol, mixtures of said glycols, and mixtures of said glycols with a member selected from the group consisting of ethylene glycol, propylene glycol, and mixtures thereof.

46. The polyurethan foam of claim 45 wherein said polycarboxylic acid component is a member selected from the group consisting of phthalic anhydride, esters of phthalic anhydride and mixtures thereof.

47. The polyurethan foam of claim 46 wherein said aliphatic dihydric alcohol is diethylene glycol.

48. The polyurethan foam of claim 3 wherein said polyalkylene terephthalate is polyethylene terephthalate, and in the digestion reaction the ratio of moles of said digesting polyol component plus moles of ethylene glycol in said polyethylene terephthalate to moles of said polycarboxylic acid component of the digesting medium plus moles of terephthalic acid in said polyethylene terephthalate is 2.1–2.6 to 1, the ratio of moles of said polyethylene terephthalate to moles of said polycarboxylic acid component of the digesting medium is 2.4–3.5 to 1, and the ratio of moles of said digesting polyol component to moles of said ethylene glycol in said polyethylene terephthalate is 1.8–2.5 to 1.

49. The polyurethane foam of claim 48 wherein said polycarboxylic acid component has aromatic ring units with two

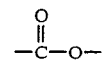

groups on adjacent or alternate ring positions, and said digesting polyol component is an aliphatic dihydric alcohol having 2 to 16 carbon atoms.

50. The polyurethane foam of claim 49 wherein said polycarboxylic acid component is a member selected from the group consisting of phthalic anhydride, phthalic acid, isophthalic acid, trimellitic anhydride, trimelltic acid, esters of said polycarboxylic acid components and mixtures thereof, and said aliphatic dihydric alcohol is a member selected from the group consisting of diethylene glycol, dipropylene glycol, mixtures of said glycols, and mixtures of said glycols with a member selected from the group consisting of ehtylene glycol, propylene glycol, and mixtures thereof.

51. The polyurethane foam of claim 50 wherein said polycarboxylic acid component is a member selected from the group consisting of phthalic anhydride, esters of phthalic anhydride and mixtures thereof, and said aliphatic dihydric alcohol is diethylene glycol.

52. The polyurethan foam of claim 51 wherein in the digestion reaction the ratio of moles of said diethylene glycol plus moles of ehtylene glycol in said polyethylene terephthalate to moles of said phthalic anhydride plus moles of terephthalic acid in said polyethylene terephthalate is 2.6 to 1, the ratio of moles of said polyethylene terephthalate to moles of said phthalic anhydride is 3.1 to 1, and the ratio of moles of said diethylene glycol to moles of said ehtylene glycol is 2.5 to 1.

* * * * *